US007957114B2

(12) United States Patent
Götz et al.

(10) Patent No.: US 7,957,114 B2
(45) Date of Patent: Jun. 7, 2011

(54) CIRCUIT BREAKER AND METHOD FOR TRIGGERING A CIRCUIT BREAKER, PARTICULARLY A LOW VOLTAGE CIRCUIT BREAKER

(75) Inventors: Josef Götz, Ebermannsdorf (DE); Frank Jucht, Hohenstein-Ernstthal (DE); Cornelia Prechtl, Schwandorf (DE)

(73) Assignee: Siemens Aktiengesellschaft, Munich (DE)

( * ) Notice: Subject to any disclaimer, the term of this patent is extended or adjusted under 35 U.S.C. 154(b) by 78 days.

(21) Appl. No.: 12/312,085

(22) PCT Filed: Oct. 18, 2007

(86) PCT No.: PCT/EP2007/061137

§ 371 (c)(1), (2), (4) Date: Apr. 24, 2009

(87) PCT Pub. No.: WO2008/049779

PCT Pub. Date: May 2, 2008

(65) Prior Publication Data

US 2010/0061029 A1 Mar. 11, 2010

(30) Foreign Application Priority Data

Oct. 26, 2006 (DE) ......................... 10 2006 051 168

(51) Int. Cl.
*H02H 3/08* (2006.01)
*H02H 9/02* (2006.01)
*H02H 9/00* (2006.01)

(52) U.S. Cl. ........................................ 361/93.1; 361/57

(58) Field of Classification Search .................. 361/93.1
See application file for complete search history.

(56) References Cited

FOREIGN PATENT DOCUMENTS

| | | |
|---|---|---|
| JP | 2001218356 A | 8/2001 |
| WO | WO 2006/007608 | 1/2006 |
| WO | WO 2006007608 A2 | 1/2006 |

OTHER PUBLICATIONS

Inushima Hiroshi, High speed breaker, Oct. 8, 2001, abstract, par. 0006-0117, drawings 1-4.*

* cited by examiner

*Primary Examiner* — Jared J Fureman
*Assistant Examiner* — Dharti H Patel
(74) *Attorney, Agent, or Firm* — Harness, Dickey & Pierce, P.L.C.

(57) ABSTRACT

In one embodiment of the present invention, a circuit breaker and a method for triggering a circuit breaker are disclosed, particularly a low voltage circuit breaker, including an electronic overload trigger, particularly for the protection against a short circuit, wherein the current is compared to a predetermined limit current and evaluated and the circuit breaker is triggered by the overload trigger, in case a short circuit is present according to the evaluation. In order to be able to reliably detect short circuits, the current is sampled with a predetermined sampling frequency and digitized. The wavelet coefficients of at least two segmentation levels are calculated for a predetermined number of digital current values in direct succession via a wavelet transformation. At least two wavelet coefficients, that is, one wavelet coefficient per segmentation level, are compared quantitatively to each other if the last of the current values in direct succession is larger than the limit current. The circuit breaker is triggered if the wavelet coefficient of a higher segmentation level is larger than the wavelet coefficient of a lower segmentation level.

13 Claims, 3 Drawing Sheets

FIG 2

$$d_{j=1,\,k} = \frac{1}{\sqrt{2}}\left(I(2k+1) - I(2k)\right)$$

$$d_{j=4,\,k=0} = d4 = \frac{1}{4}\left(\sum_{m=k+8}^{m=k+15} I(m) - \sum_{m=k}^{m=k+7} I(m)\right)$$

$$= \frac{1}{4}\left(\sum_{m=8}^{m=15} I(m) - \sum_{m=0}^{m=7} I(m)\right)$$

FIG 3

$$d_{j,\,k} = 2^{-j/2}\int_{t_{ab}} I(t)\, W(2^{-j}\cdot t-k)\,dt$$

FIG 4

$$W(t) = \begin{cases} 1 & 0 \le t < 1/2 \\ -1 & 1/2 \le t < 1 \\ 0 & \text{other} \end{cases}$$

CIRCUIT BREAKER AND METHOD FOR TRIGGERING A CIRCUIT BREAKER, PARTICULARLY A LOW VOLTAGE CIRCUIT BREAKER

PRIORITY STATEMENT

This application is the national phase under 35 U.S.C. §371 of PCT International Application No. PCT/EP2007/061137 which has an International filing date of Oct. 18, 2007, which designated the United States of America, and which claims priority on German patent application number DE 10 2006 051 168.9 filed Oct. 26, 2006, the entire contents of each of which are hereby incorporated herein by reference.

FIELD

At least one embodiment of the invention relates to a circuit breaker and to a method for triggering a circuit breaker, particularly a low voltage circuit breaker, in accordance with the preambles of claims 1 and 6.

BACKGROUND

Low voltage circuit breakers or circuit breakers for short are known and are used for energy distribution up to 6300 Amperes in low voltage switchgear as incoming feeder circuit breakers or outgoing branch circuit breakers. The term circuit breaker characterizes a mechanical switching device which can switch on, carry and switch off currents with the aid of an electronic overload trigger under operating conditions in the circuit. They are also used as switching and protection devices for motors, capacitors, generators and transformers however, but can also be used as emergency stop switches.

With the circuit breakers the current is compared with a threshold current in each case and the circuit breaker is triggered if the threshold current is exceeded by a predetermined value, with the exceeding of the threshold current serving as an indication of the presence of a short circuit. The exceeding of the threshold current can however also be triggered in another way, e.g. through switching processes which are linked to an overcurrent in a similar manner to a short circuit. Frequency converters can also cause overcurrents that, interpreted as short circuits, would lead to the triggering of the circuit breaker.

SUMMARY

At least one embodiment of the invention safely detects short circuits in order to avoid false triggering of the circuit breaker.

A provision is made in relation to a method and/or a circuit breaker of at least one embodiment for the current to be sampled with a fixed predetermined sampling frequency and digitized, for the wavelet coefficient to be calculated by means of a wavelet transformation for at least two segmentation levels for a fixed predetermined number of directly consecutive digital current values, for at least two wavelet coefficients, i.e. one wavelet coefficient per segmentation level, to be compared quantitatively with each other, if the last of the current values in direct succession is larger than the threshold current, and for the circuit breaker to be triggered if the wavelet coefficient of a higher segmentation level is larger than the wavelet coefficient of a lower segmentation level.

The effective identification of a short circuit makes provision for current value determination and the computation of the wavelet coefficients to occur cyclically, with the current values in direct succession included for the computation in each case being modified, after determination of a new current value before renewed computation of the wavelet coefficient, such that the current value lying furthest back in time is no longer taken into account and instead the new current value determined is taken into account.

In practical terms it is sufficient for the wavelet coefficients only to be computed for two segmentation levels and for the amounts of the wavelet coefficients to be compared with each other.

In the simplest case the wavelet coefficients of the first and fourth segmentation level are computed and the amount of the single wavelet coefficient of the fourth segmentation level is at least compared with the amounts of the two wavelet coefficients with k=6 and 7 of the first segmentation level and the circuit breaker is triggered if the wavelet coefficient is larger than these two wavelet coefficients.

For 50 Hz and 60 Hz a new sampling cycle is started after 606.4 μs in each case.

BRIEF DESCRIPTION OF THE DRAWINGS

Embodiments of the invention will be described in more detail below with reference to a drawing. The figures are as follows:

FIG. 4 the definition of the Haar wavelet; and

DETAILED DESCRIPTION OF THE EXAMPLE EMBODIMENTS

Figure 1:
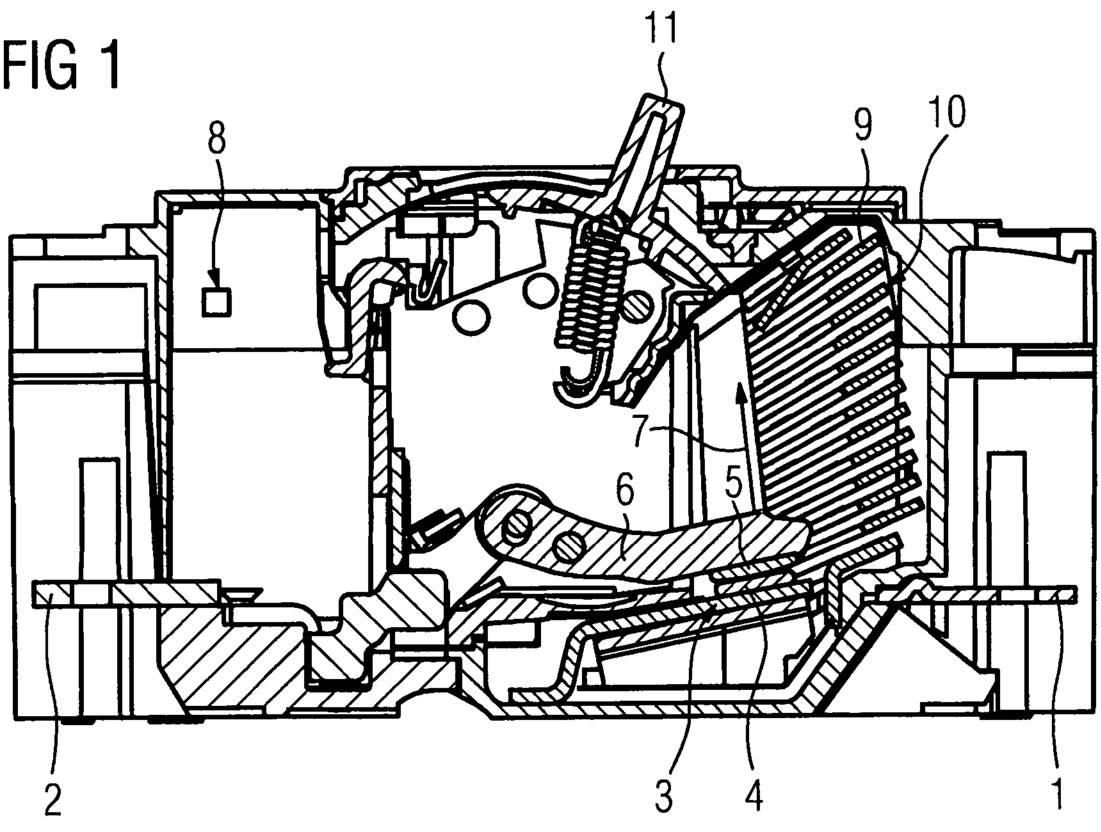
FIG. 1 a low voltage circuit breaker with an electronic overload trigger for a phase conductor, FIG. 2 the formula for the wavelet coefficients, FIG. 3 the definition of the wavelet transformation.

FIG. 1 shows a low voltage circuit breaker, referred to below as a circuit breaker for short, that has two terminals 1, 2, via which a load (terminal 2) is able to be connected to a power supply network (connection terminal 1). The two connection terminals 1, 2 are connected to each other via a releasable contact 3 that comprises a fixed contact element 4 and a movable contact element 5. The fixed contact element 4 is connected in the circuit breaker in FIG. 1 to the power-side terminal 1 and the movable contact element 5 to the load-side terminal 2. The movable contact element 5 is arranged on an end of a pivotable contact arm 6 which can be pivoted in the direction of the arrow (arrow 7). The contact arm 6 is pivoted in each case after triggering by a trigger unit 8 shown only schematically in the figure, which, in the event of a short circuit, initiates a disconnection of the two contact elements 4, 5 by pivoting the contact arm 6. The arcing which occurs regularly between the contact elements 4, 5 in such cases is extinguished with the aid of arc splitter plates 9 of an arc extinction chamber 10. A manually-actuatable switching lever 11 allows the circuit breaker to be activated manually if required or put back into the ready position.

Figure 5:
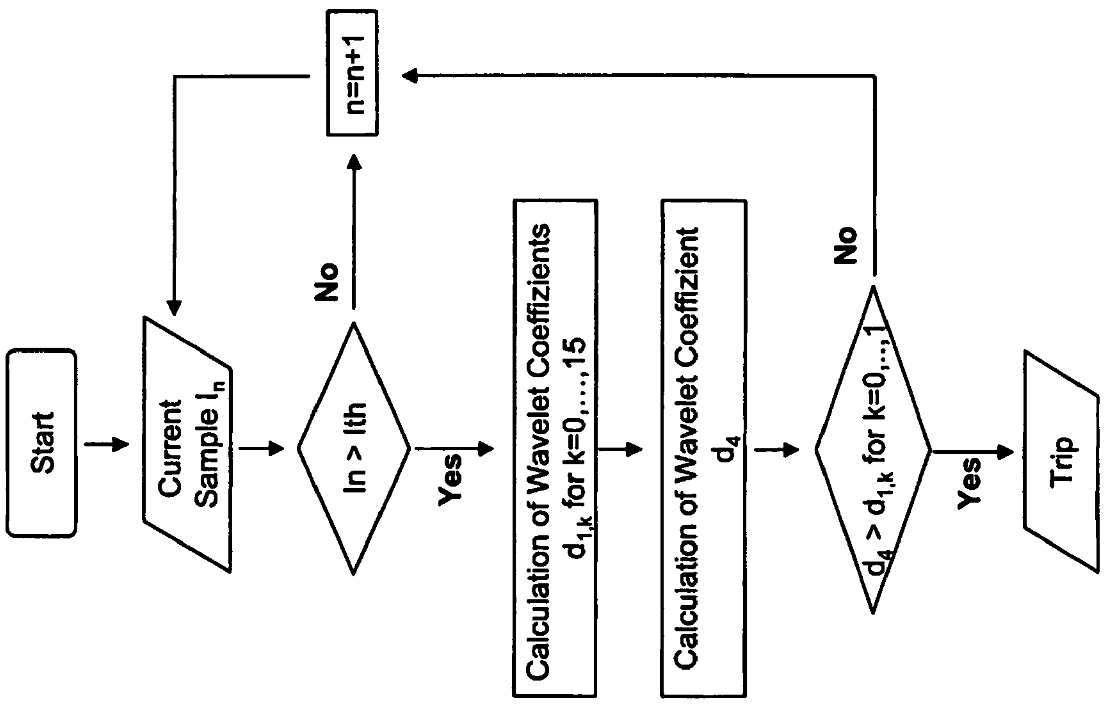
FIG. 5 shows a flowchart of an example method for triggering a circuit breaker.

The flowing current I(t) as a function of the time t is sampled at a fixed predetermined sampling frequency f at an interval tf and stored in digital form in a memory (FIG. 5), with the storage being undertaken such that the last 16 current values in direct succession In(t) with n=0 to n=15 are held in the memory in each case, i.e. before storage of a new current value In(t) the respective oldest current value In(t), with n=0, held in the memory is deleted.

If the last sampled current value In(t) with n=15 is larger than a predetermined threshold current Ith, then for fixed predetermined number, here for the 16 current values In(t) in the memory, wavelet coefficients dj, k (see FIG. 2) are computed and compared quantitatively with each other.

In general j, k are positive whole numbers in each case, with k beginning at 0 and j at 1 and j being referred to as the segmentation level. The segmentation levels j begin at j=1: j=1 is the first segmentation level, j=2 the second segmentation level, etc.

The whole number k in FIG. 2 indicates how often a wavelet W selected for the wavelet transformation is displaced in steps in the computation in accordance with the definition of the wavelet transformation in FIG. 3. The choice of k for a wavelet W is made in each case by the current signal I(t) in the associated time segment tab, over which integration is to take place being completely covered once by the displacement. The current signal I(t) is formed here from the 16 current values In(t) held in the memory; The time segment tab is thus equal in this case to 16 times the time difference between two sampling times, i.e. equal to 16 times the sampling time tf.

The simplest example for a wavelet W is the so-called Haar wavelet Wh, the definition of which is shown in FIG. 4.

This wavelet Wh has been used here for computation of the wavelet coefficient dj, k by means of fast wavelet transformation.

The result of the computation are the formulae shown in FIG. 2 for the wavelet coefficients dj, k for the two segmentation levels j=1 and j=4, i.e. the wavelet coefficients d1, k for k=0 to 7 and d4, k for k=0. The latter is abbreviated as wavelet coefficient d4.

The circuit breaker is triggered by the trigger unit 8 if the wavelet coefficient d4 of the higher segmentation level j=4 is larger than each of the wavelet coefficients d1, k with k=0 to 7 of the lower segmentation level 1. In such cases it is mostly practically sufficient to include only the last two wavelet coefficients d1, k for comparison, that is the wavelet coefficients d1, 6 and d1, 7 for which k=6 and 7. k runs here from 0 to 7 and the wavelet coefficients d1, 6 and d1, 7 with the two largest values are included.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for triggering a circuit breaker in the event of a short circuit in which a current flowing in a phase conductor is evaluated by comparing the current with a threshold current, and the circuit breaker is triggered if a result of the evaluation reveals a presence of a short circuit, the method comprising:

- sampling the current at a fixed sampling frequency and digitizing the sampled current to determine digital current values;
- computing, for a fixed number of the digital current values in direct succession, wavelet coefficients for at least two segmentation levels by way of a wavelet transformation;
- comparing the absolute value of at least two wavelet coefficients with each other if a last of the digital current values in direct succession is greater than the threshold current; and
- triggering the circuit breaker if the wavelet coefficient of a higher segmentation level is greater than the wavelet coefficient of a lower segmentation level.

2. The method as claimed in claim 1, wherein the determination of the digital current values and the computation of the at least two wavelet coefficients is undertaken cyclically, with the digital current values in direct succession included for the computation, after determination of a new current value before a new computation of the wavelet coefficients being modified such that the current value lying furthest back in time is no longer taken into account but the newly determined current value is taken into account instead.

3. The method as claimed in claim 2, wherein the wavelet coefficients are only computed for two segmentation levels and the amounts of these wavelet coefficients are compared with each other.

4. The method as claimed in claim 3, wherein the wavelet coefficients of the first and fourth segmentation level are computed and the amount of the single wavelet coefficient of the fourth segmentation level is compared at least with the amounts of the two wavelet coefficients of the first segmentation level and the circuit breaker is triggered if the amount of the single wavelet coefficient of the fourth segmentation level is larger than the amount of two wavelet coefficients.

5. The method as claimed in claim 1, wherein the wavelet coefficients are only computed for two segmentation levels and the absolute values of these wavelet coefficients are compared with each other.

6. The method as claimed in claim 5, wherein the wavelet coefficients of the first and fourth segmentation level are computed and the absolute value of the single wavelet coefficient of the fourth segmentation level is compared at least with the absolute values of the two wavelet coefficients of the first segmentation level and the circuit breaker is triggered if the absolute value of the single wavelet coefficient of the fourth segmentation level is greater than the absolute values of two wavelet coefficients.

7. The method as claimed in claim 1, wherein a new sampling cycle is started every 606.4 μs.

8. The method of claim 1, wherein the method is for triggering a low voltage circuit breaker.

9. The method of claim 1, wherein the comparing the absolute value of the at least two wavelet coefficients includes qualitatively comparing one wavelet coefficient per segmentation level.

10. A circuit breaker, comprising:

- an electronic overload trigger that triggers the circuit breaker, wherein current flowing in a phase conductor connected to the circuit breaker is sampled at a fixed sampling frequency and digitized, and wavelet coefficients of at least two segmentation levels are computed by way of a wavelet transformation for a fixed number of digital current values in direct succession, and the absolute value of at least two wavelet coefficients are compared with each other if a last of the current values in direct succession is greater than a threshold current, and the circuit breaker being triggered if the wavelet coefficient of a higher segmentation level is greater than the wavelet coefficient of a lower segmentation level.

11. The circuit breaker of claim 10, wherein the circuit breaker is a low voltage circuit breaker for said phase conductor through which current flows.

12. The circuit breaker of claim 10, wherein the electronic overload trigger is for protection against a short circuit.

13. A circuit breaker, comprising:

- means for sampling a current current flowing in a phase conductor at a fixed sampling frequency and for digitizing the sampled current to determine digital current values;
- means for computing, for a fixed number of the digital current values in direct succession, wavelet coefficients for at least two segmentation levels by way of a wavelet transformation;

means for comparing the absolute value of at least two wavelet coefficients with each other if a last of the digital current values in direct succession is greater than the threshold current; and an electronic overload trigger that trigger the circuit breaker if the wavelet coefficient of a higher segmentation level is larger than the wavelet coefficient of a lower segmentation level.

* * * * *